United States Patent [19]
Smith

[11] Patent Number: 5,747,987
[45] Date of Patent: May 5, 1998

[54] SENSOR WITH AN ARCUATE ABRADABLE RIB USED FOR POSITIONING

[75] Inventor: Paul E. Smith, Freeport, Ill.

[73] Assignee: Honeywell Inc., Minneapolis, Minn.

[21] Appl. No.: 691,224

[22] Filed: Aug. 1, 1996

[51] Int. Cl.$^6$ .................. G01B 7/30; G01P 3/44; G01P 3/488; G01P 1/02

[52] U.S. Cl. .......... 324/207.13; 73/493; 123/617; 324/173; 324/207.25

[58] Field of Search ................. 324/160, 163, 324/164, 166, 173, 174, 207, 207.11–207.13, 207.15–207.17, 207.2, 207.21, 207.22, 207.25; 123/617; 73/660, 661, 488, 493, 514.39; 310/168

[56] References Cited

U.S. PATENT DOCUMENTS

| | | |
|---|---|---|
| 3,101,615 | 8/1963 | Pavone .................. 324/173 X |
| 3,745,392 | 7/1973 | Phoenix et al. ............ 324/173 X |
| 5,121,289 | 6/1992 | Gagliardi . |
| 5,140,262 | 8/1992 | Stolfus .................. 324/207.2 |
| 5,341,097 | 8/1994 | Wu .................... 324/207.2 |
| 5,414,355 | 5/1995 | Davidson et al. .......... 324/207.2 |
| 5,444,370 | 8/1995 | Wu .................... 324/207.2 |
| 5,670,873 | 9/1997 | Onishi et al. ............ 324/207.15 X |

FOREIGN PATENT DOCUMENTS 3621155  1/1988  Germany .................. 324/173

*Primary Examiner*—Gerard R. Strecker
*Attorney, Agent, or Firm*—William D. Lanyi

[57] ABSTRACT

A sensor is provided with a rib that extends from its sensing face. The rib is arcuate to conform to a surface of a rotatable object. The rib can be a continuous arcuate rib attached to the sensing face or two or more disconnected sections that together define an arcuate rib. The arcuate rib is shaped to conform to a surface or effective surface of a rotatable object, such as a gear or other rotatable target.

7 Claims, 5 Drawing Sheets

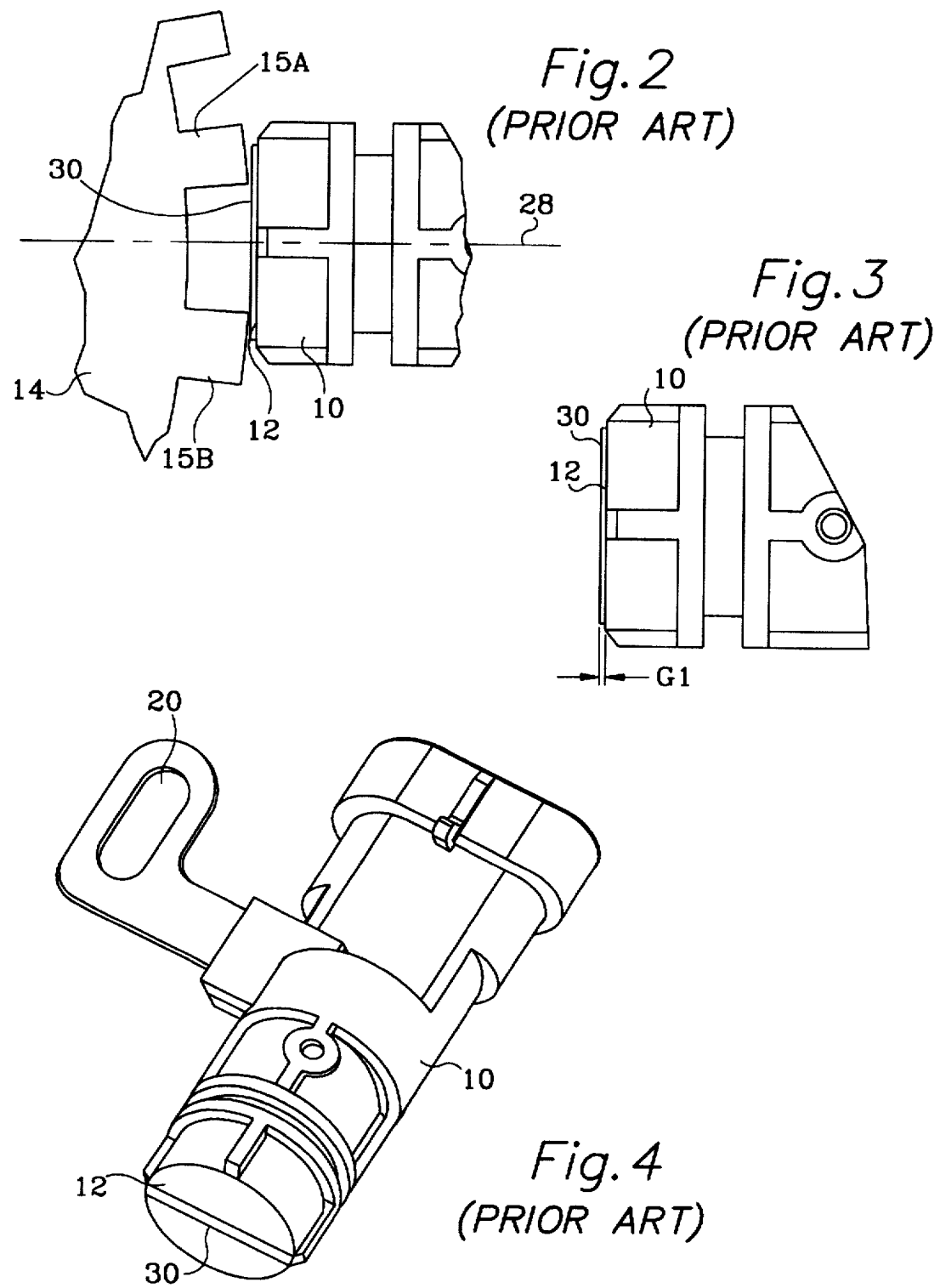

1

SENSOR WITH AN ARCUATE ABRADABLE RIB USED FOR POSITIONING

BACKGROUND OF THE INVENTION

1. Field of the Invention

The present invention is generally related to the positioning of a sensor near a target and, more particularly, to an arcuate abradable rib disposed on the sensing face of a sensor housing structure to allow the sensor to be accurately placed with a preselected gap between the sensor face and a target.

2. Description of the Prior Art

Many types of sensors are known to those skilled in the art. One particular type of sensor for which the present invention is adaptable is a magnetic sensor, such as a geartooth sensor for use in automobile engines. U.S. Pat. No. 5,121,289, which issued to Gagliardi on Jun. 9, 1992, illustrates the basic shape and configuration of a geartooth sensor, including the position of a magnetically sensitive component within a housing structure of the geartooth sensor.

U.S. Pat. No. 5,140,262, which issued to Stolfus on Aug. 18, 1992, describes a geartooth sensor with a centerline in nonintersecting relation with a center of rotation of a rotatable member. This patent illustrates the relative position between a magnetically sensitive component and a sensing face of the sensor. It also shows the relationship between the sensing face and a rotatable object which serves as a target to be sensed by the magnetically sensitive component.

U.S. Pat. No. 5,341,097, which issued to Wu on Aug. 23, 1994, describes an asymmetrical magnetic position detector. Two magnetically sensitive components are disposed in a plane that is generally parallel to the polar axis of a permanent magnet and offset from the axis.

U.S. Pat. No. 5,414,355, which issued to Davidson et al on May 9, 1995, describes a magnet carrier disposed within an outer housing. The magnet carrier is intended to protect a magnetically sensitive component and form the basic structure around which a geartooth sensor is formed by overmolding processes.

U.S. Pat. No. 5,444,370, which issued to Wu on Aug. 22, 1995, illustrates a geartooth sensor for use with two magnetically sensitive target tracks arranged in a complementary configuration.

In order to position the sensing face of a housing structure at a precise distance from a rotatable object, or target, it is known to those skilled in the art to provide an abradable rib attached to the sensing face or formed as a protrusion from the sensing face. During installation, the sensor is moved toward the rotatable object until the abradable rib is in contact with an outer surface of the rotatable object. The abradable rib is shaped to provide a precise preselected distance between the point of contact between the rib and the movable object and the position of the magnetically sensitive component within the housing structure. However, a problem often occurs when using abradable ribs known to those skilled in the art. Depending on the spacing of the teeth and slots on a rotatable object and depending on the angular position of the rotatable object when the magnetic sensor is installed, the actual position of the sensor with respect to the outer surface of the rotatable object can vary. The mechanisms that can cause this variation will be described in detail below, but it should be understood that known rib designs are subject to inaccurate positioning as a result of the angular position of the rotatable object at the time when the sensor is installed. It would therefore be significantly beneficial if the installation of a sensor could be performed accurately without being dependent on the position of the rotatable object at the time of installation.

SUMMARY OF THE INVENTION

A sensor made in accordance with the present invention comprises a component which is sensitive to a preselective parameter. The parameter can be a magnetic field or any other physical parameter that is capable of being sensed by a component. The invention further comprises a housing structure. The component is disposed within the housing structure proximate a sensing face of the housing structure. The sensing face is disposable proximate a rotatable object and the component is selected to be responsive to movement of the rotatable object. An arcuate abradable rib is attached to the sensing face of the housing structure and is shaped to conform to an outer surface of the rotatable object in order to prevent the sensing face from being disposed closer to the rotatable object than a preselected distance.

In one embodiment of the present invention, the component is magnetically sensitive and the rotatable object is a metallic gear. The metallic gear can be a rotatable object within or associated with an automobile engine.

In one embodiment of the present invention, the arcuate rib is formed in two disconnected sections with a space therebetween.

BRIEF DESCRIPTION OF THE DRAWINGS

The present invention will be more fully and completely understood from a reading of the Description of the Preferred Embodiment in conjunction with the drawings, in which:

FIGS. 2, 3 and 4 show a known type of sensor with a rib attached to its sensing face;

DESCRIPTION OF THE PREFERRED EMBODIMENT

Figure 1:
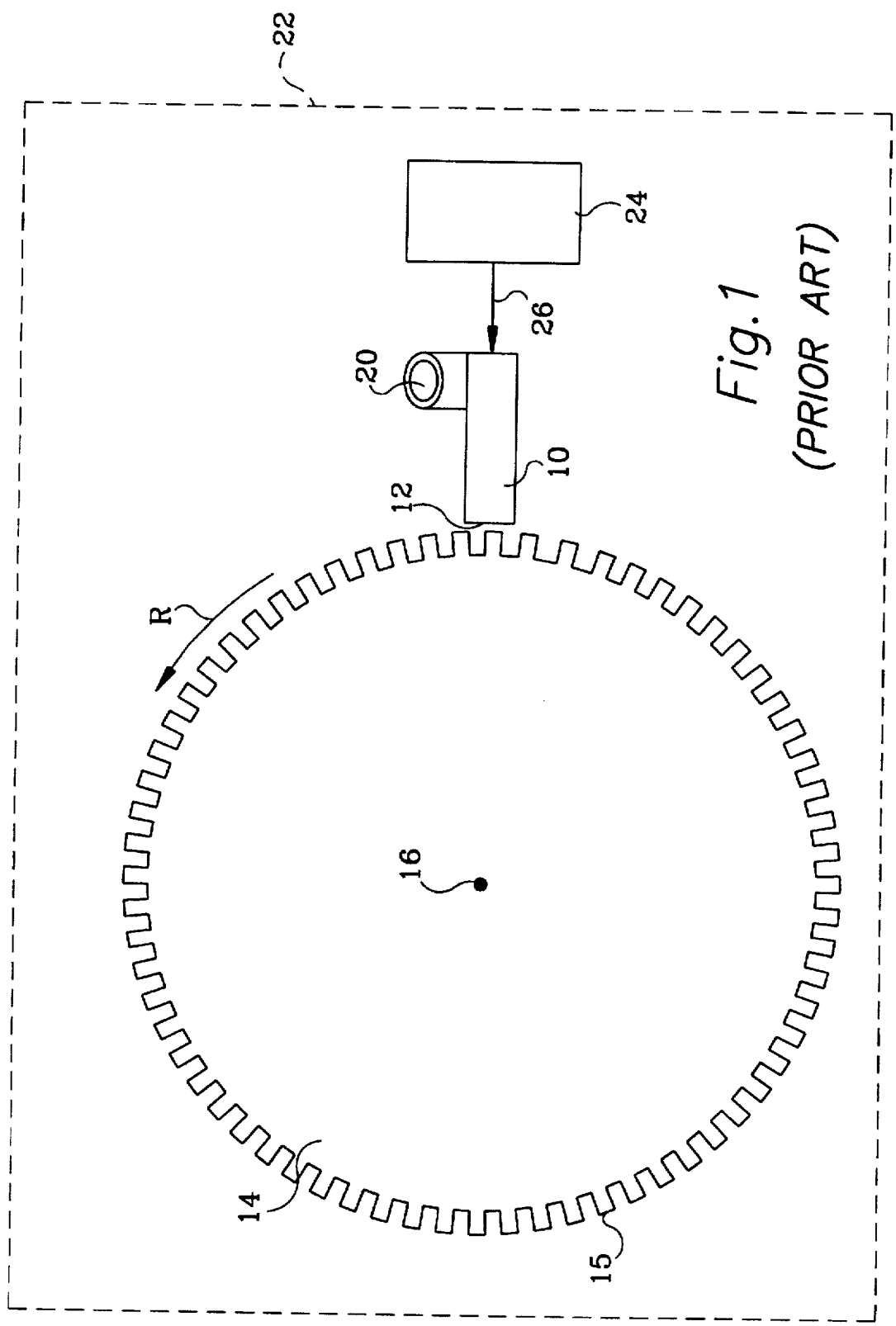
FIG. 1 illustrates a typical application of a sensor in conjunction with a rotatable object.

Throughout the Description of the Preferred Embodiment of the present invention, like components will be identified by like reference numerals. FIG. 1 illustrates a typical application of a magnetic sensor. The housing of the magnetic sensor 10 is provided with a sensing face 12 that is disposed proximate a surface, or effective surface, of a rotatable object 14 that is provided with a plurality of teeth 15. The effective surface is the path along which the outermost edges of the teeth pass, as will be described below. The rotatable object 14 is rotatable about an axis of rotation 16 as indicated by arrow R. The sensor 10 is provided with a means for mounting it to an automobile engine, which is schematically represented by dashed box 22 in FIG. 1. The mounting means can be a hole 20 that permits the sensor 10 to be rigidly fastened to a portion of the engine 22. In a typical application of a geartooth sensor, a controller 24 is connected in signal communication with the geartooth sensor 10 by a conductor 26. The controller 24 can be a microprocessor or other suitable electronic means that is responsive to signals provided by the geartooth sensor.

FIG. 2 illustrates an enlarged view of the sensing end of the geartooth sensor 10 and two teeth, 15A and 15B, of the rotatable object 14. As shown in FIG. 2, neither one of the two teeth, 15A and 15B, is positioned directly on the centerline 28 along which the sensor 10 is moved during installation. Because the central region of the sensing face 12 is not in contact with any of the teeth of the rotatable object 14, the sensor 10 moves farther toward the central axis 16 of the rotatable object 14 than intended. The specific geometry relating to this problem will be discuss in greater detail below in conjunction with FIG. 5.

In FIGS. 2 and 3, a rib 30 is shown attached to the sensing face 12. The rib 30 can be abradable. In a typical application of a sensor 10 with a rib 30, the dimension of the rib is selected to provide a specific intended gap $G_I$ between the sensing face 12 and an outer surface of the rotatable object. In a typical application, the outer surface of the rotatable object is defined as the outermost surfaces at the tips of the individual teeth 15. In other words, when the rotatable object 14 rotates about its axis 16, the sensing face 12 is intended to be disposed at a precise intended gap $G_I$ from the tips of the teeth 15 as they move past the sensing face because of the object's rotation.

FIG. 4 illustrates a perspective view of an exemplary geartooth sensor 10. The rib 30 is shown protruding from the sensing face 12 and the elongated hole 20, or groove, is illustrated as a typical means for mounting the sensor 10 to an automobile engine or other object.

Figure 5:
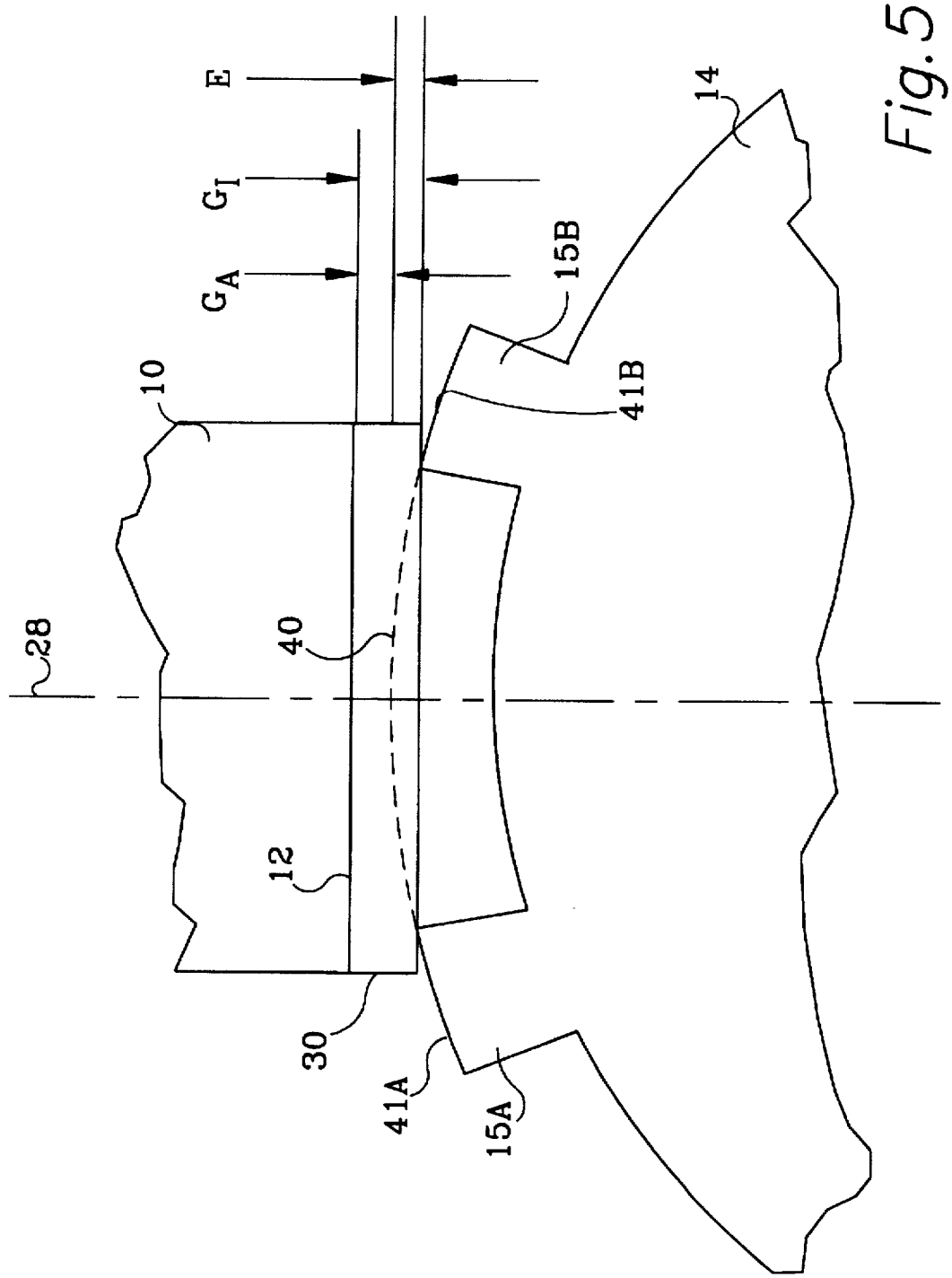
FIG. 5 is a expanded view of FIG. 2, showing the geometric analysis of potential problems with the prior art ribs.

FIG. 5 illustrates the geometry of how known abradable ribs can fail to provide the accurate positioning for which they are intended. In FIG. 5, the sensor 10 and the rib 30 are shown schematically with respect to a rotatable object 14 and two of its teeth, 15A and 15B. The arrangement illustrated in FIG. 5 is generally similar to that shown in FIG. 2. The thickness of the rib 30 is generally selected to provide an intended gap $G_I$ between the sensing face 12 and a surface of the rotatable object 14. In most applications, the surface is defined as the region along which the tips of the teeth 15 pass. For purposes of this discussion, this surface is represented by dashed line 40. The outer surfaces of the teeth, identified as 41A and 41B in FIG. 5, define the size and shape of the surface 40. With the two teeth in the position shown in FIG. 5, the sensor 10 would typically be moved downward along centerline 28 until the rib 30 moves into contact with the object 14. If the teeth are in the position shown in FIG. 5, the sensor 10 would move to the position illustrated in FIG. 5. It can be seen that if one of the teeth 15 had been positioned directly on axis 28, the sensor 10 would not have moved down as far. Instead, the rib 30 would have moved into contact with the radially outermost surface, such as 41A or 41B. This variability in positioning of the sensor 10 is dependent on the radial or angular position of the rotatable object 14 during the installation of the sensor. The dimensions in FIG. 5 represent the possible severity of this problem. The intended gap $G_I$ is typically equivalent to the thickness of the rib 30 measured in the direction extending away from the sensing face 12. The actual gap $G_A$ is defined as the distance between the sensing face 12 and the portion of the object 14 that moves closest to it. As can be seen, the actual gap $G_A$ is significantly smaller than the intended gap $G_I$. Since the rib 30 is typically made of an abradable material, such as plastic, the metallic teeth 15 can easily scrap away portions of the rib and the teeth 15 then pass along a path coincident with the surface 40 which is much closer to the sensing face 12 than intended. This error E is illustrated in FIG. 5 as being equivalent to the difference between the intended gap $G_I$ and the actual gap $G_A$.

Figure 6:
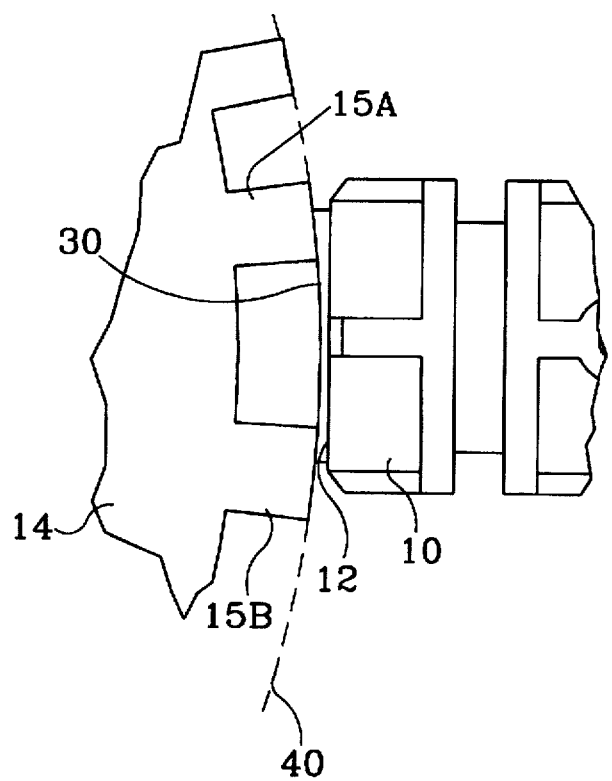
FIGS. 6, 7 and 8 show three views of a sensor made in accordance with the present invention.
Figure 7:
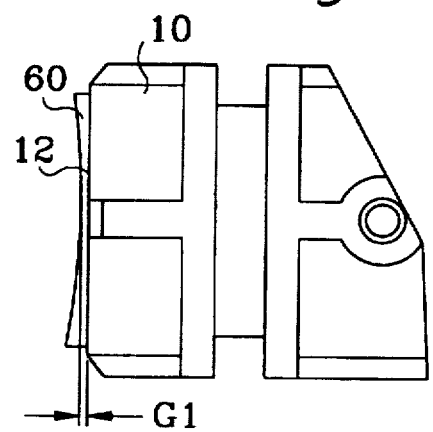
Figure 8:
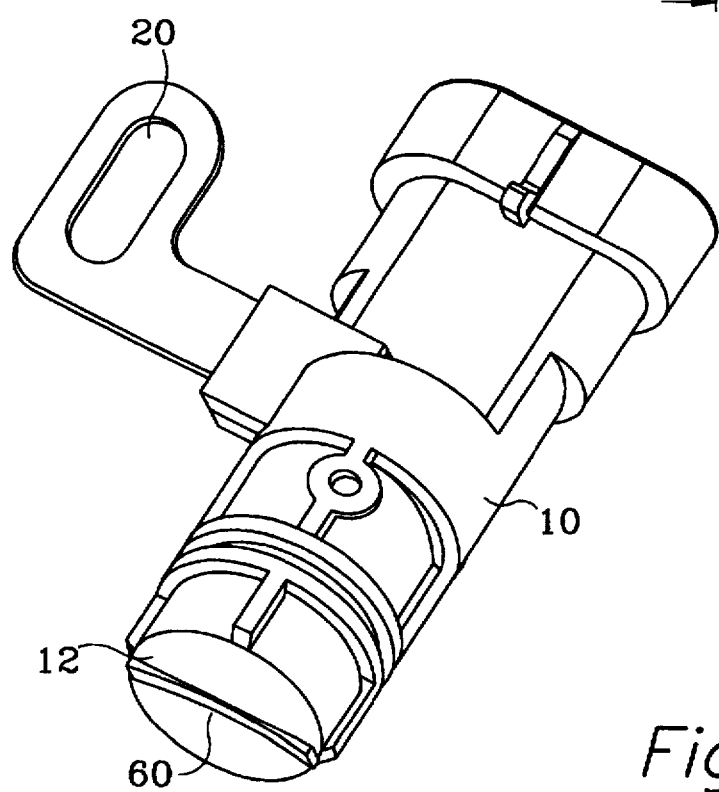

The present invention, as illustrated in FIGS. 6, 7 and 8, avoids the misalignment described above in conjunction with FIG. 5. In FIG. 6, the sensor 10 is shown in relation to the teeth, 15A and 15B, of a rotatable object 14. However, instead of the rib 30 described above, an arcuate rib 60 is attached to the sensing face 12. The arcuate rib is shaped to be generally equivalent to a surface of the rotatable object 14. For example, it can be shaped to conform to an outer surface of the rotatable object 14. In this particular instance, the outer surface of the rotatable object 14 is the effective surface defined by the passage of the teeth as represented by dashed line 40 in FIG. 5. The arcuate nature of the rib 60 can be seen in FIG. 6. It generally conforms to the surface represented by dashed line 40 and which is defined by the rotational path of the outer most surfaces of the teeth 15. The length of the ribs arcuate surface should be greater than the largest gap between any two adjacent teeth.

FIG. 7 shows the sensor 10 without the rotatable object 14. The rib 60 is arcuate in shape and is attached to the sensing face 12. It should be understood that in most applications of the present invention, the rib 60 would be formed during a molding process from the same material used to fabricate the housing structure 10. The minimum thickness of the rib 60, as measured from the sensing face 12, defines the intended gap $G_I$.

FIG. 8 is a perspective view of the present invention which shows the rib 60 extending from the sensing face 12. The attaching means 20 is generally identical to the attaching means described above.

Figure 9:
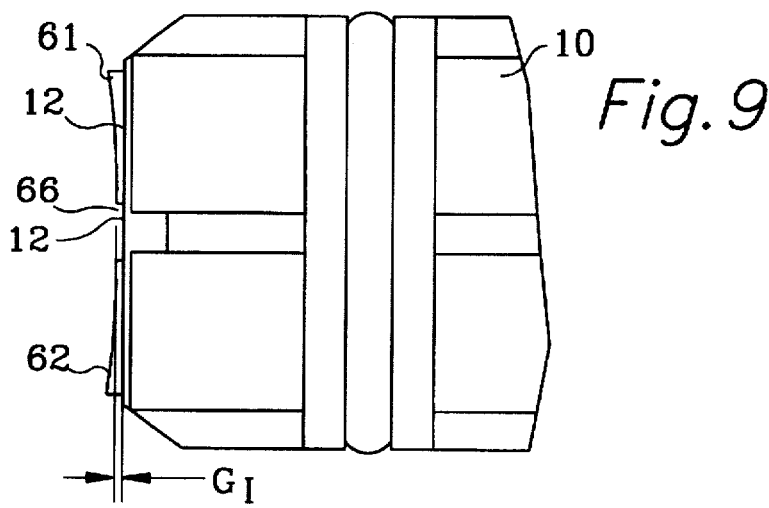
FIGS. 9, 10 and 11 show three views of an alternative embodiment of the present invention.

FIG. 9 shows an alternative embodiment of the present invention which provides certain advantages. The arcuate rib 60 is formed in two disconnected sections, 61 and 62. A space 66 provided between the two disconnected sections, 61 and 62 should be smaller than the smallest tooth. The minimum thickness of the rib, as measured from the sensing face 12, is the intended gap $G_I$. One advantage of the embodiment shown in FIG. 9 is that it reduces the quantity of molding material needed to fabricate the housing structure. The space 66 reduces the amount of material used. This allows for easier and faster abrasion of the rib, reduces noise during the abrasion process, reduces drag on the engine and minimizes the amount of debris in the engine cavity.

Figure 10:
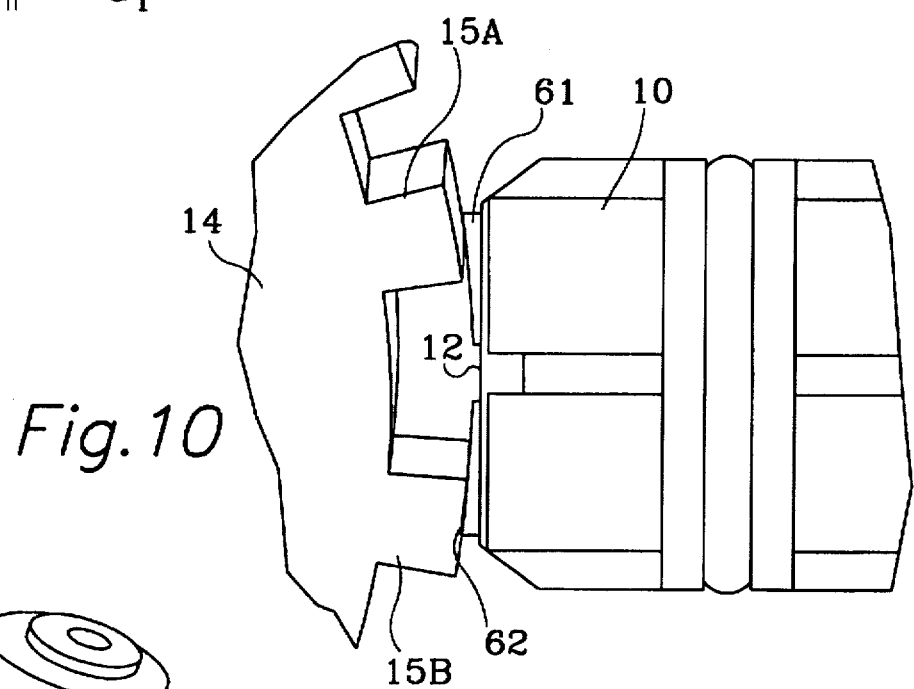

FIG. 10 shows a sensor 10 made in accordance with the embodiment of the present invention described above in conjunction with FIG. 9. The two disconnected sections, 61 and 62, are attached to the sensing face 12. The size and shape of the two disconnected sections, 61 and 62, are similar to illustration 9. A rotatable object 14 is shown associated with the arcuate rib that comprises the two disconnected sections. It should be understood that throughout this discussion, the concept of the present invention involves an arcuate rib, regardless of whether the rib 60 comprises one continuous member or two disconnected sections, 61 and 62. The space 66, although it provides certain advantages, is not a requirement of the present invention does not change its basic character.

Figure 11:
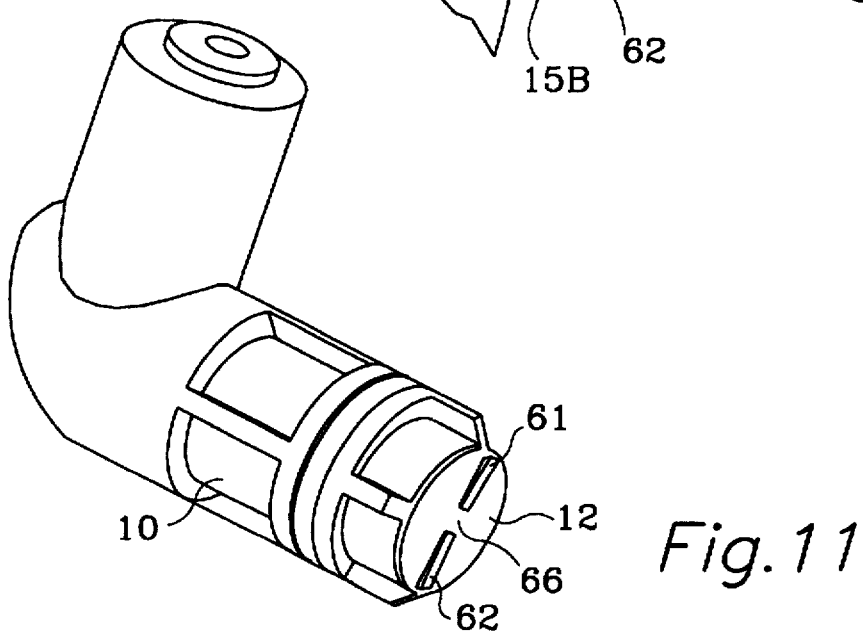

FIG. 11 is a perspective view of the present invention, showing the sensor 10 with its sensing face 12. The two disconnected sections, 61 and 62, of the rib are illustrated as protrusions from the sensing face 12.

Although the present invention has been described in detail to illustrate a specific embodiment, it should be understood that alternative embodiments are within its scope.

The embodiments of the invention in which an exclusive property or right is claimed are defined as follows:

1. A sensor, comprising:

a component which is sensitive to a preselected parameter;

a housing structure, said component being disposed within said housing structure, said housing structure having a sensing face which is disposable proximate a rotatable object, said component being disposed within said housing structure proximate said sensing face and being selected to be responsive to movement of said rotatable object; and a rib attached to said sensing face, said rib having an arcuate surface facing the rotatable object being shaped to conform to an outer arcuate surface of said rotatable object and prevent said sensing face from being disposed closer to said rotatable object than a preselected distance.

2. The sensor of claim 1, wherein:

said component is magnetically sensitive.

3. The sensor of claim 2, wherein:

said rotatable object is a metallic gear.

4. The sensor of claim 1, wherein:

said rib is formed in two disconnected sections, said two disconnected sections being separated by a space.

5. The sensor of claim 3, wherein:

said rib is formed in two disconnected sections, said two disconnected sections being separated by a space.

6. The sensor of claim 1, wherein:

said rotatable object is a metallic gear.

7. The sensor of claim 6, wherein:

said rib is formed in two disconnected sections, said two disconnected sections being separated by a space.

* * * * *